No. 710,980. Patented Oct. 14, 1902.
G. W. JARMIN.
PLANTING MACHINE.
(Application filed Apr. 11, 1902.)
(No Model.) 4 Sheets—Sheet 1.
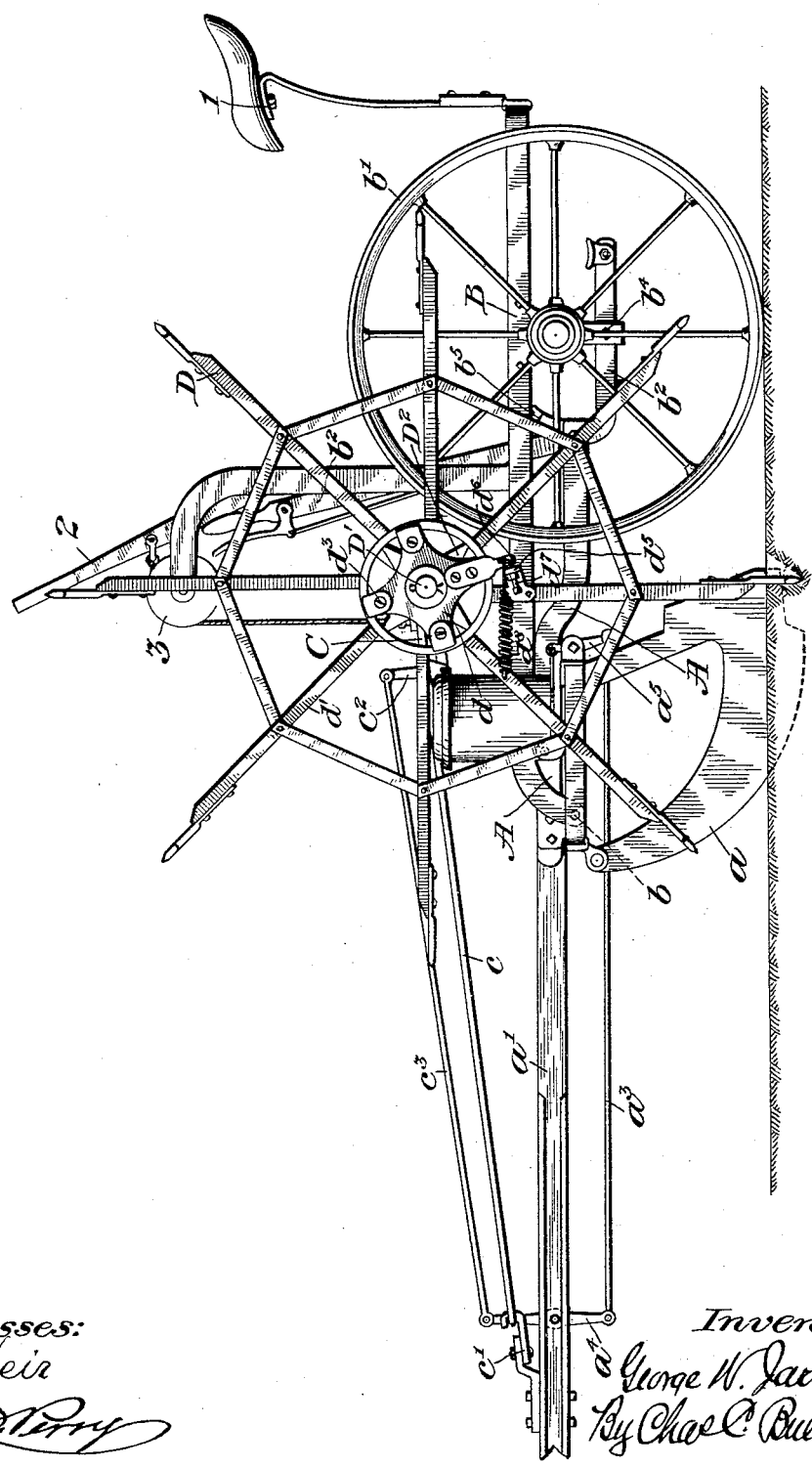
Witnesses:
Inventor:
George W. Jarmin
By Chas C Buckley Atty

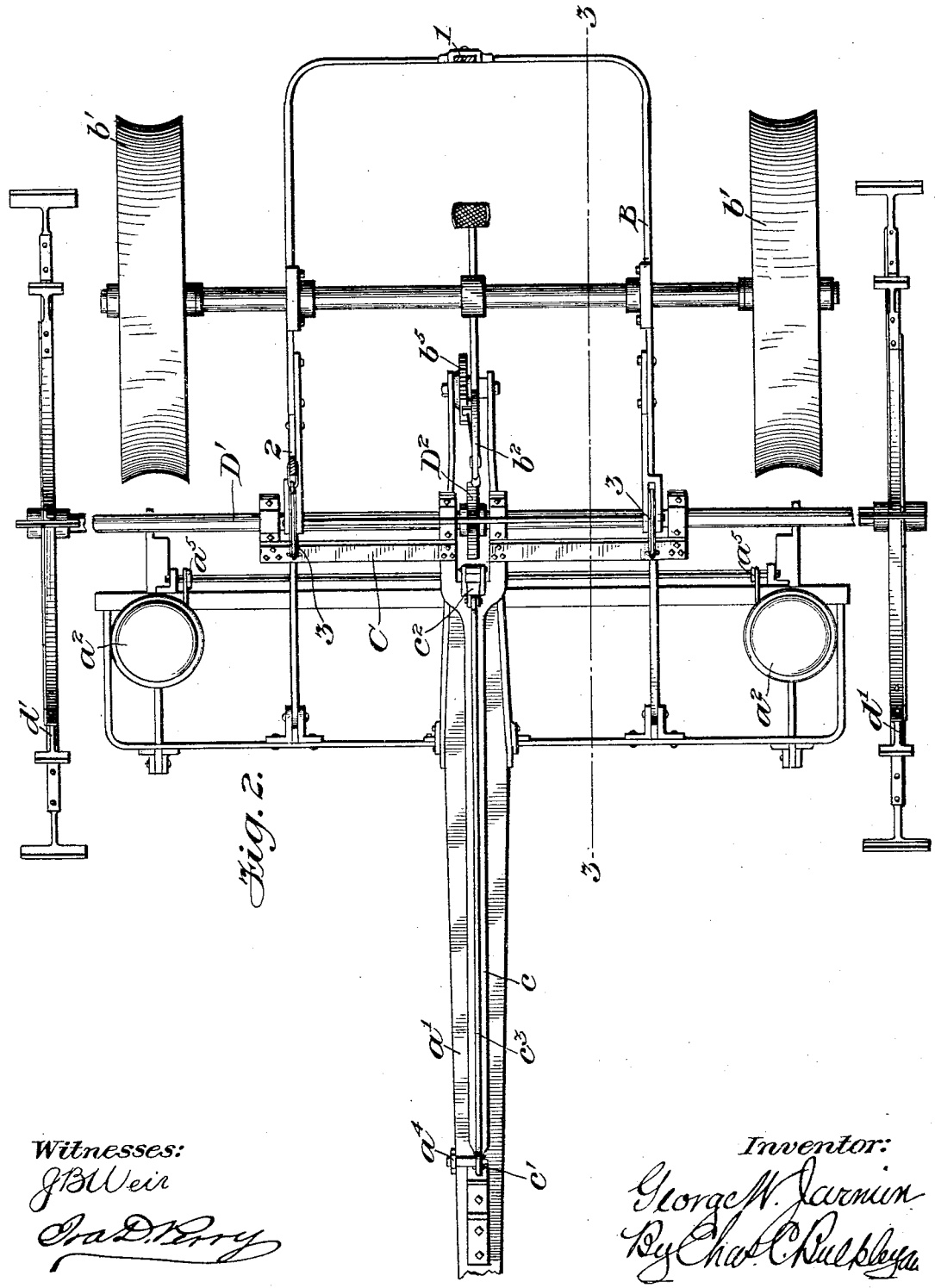

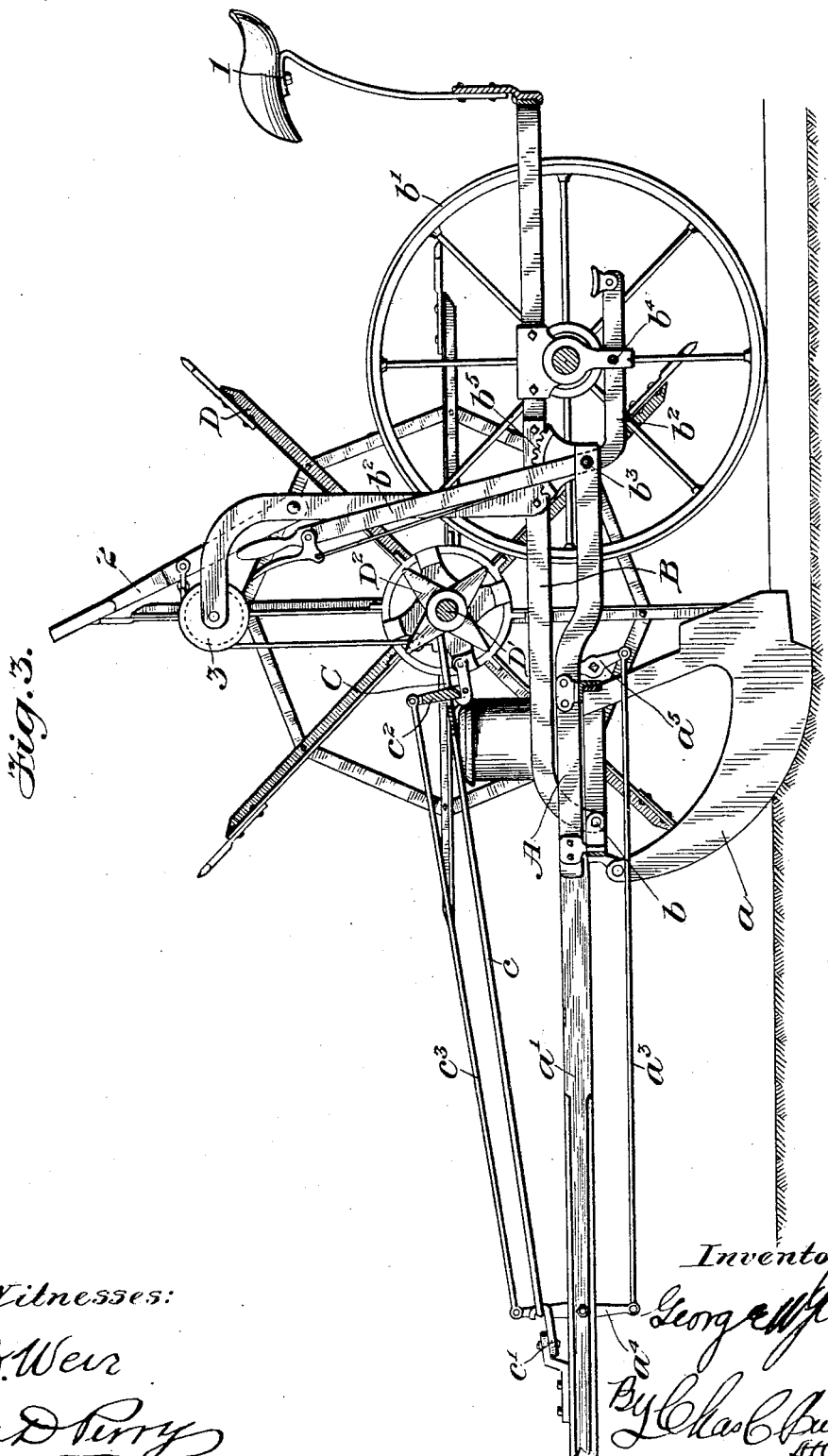

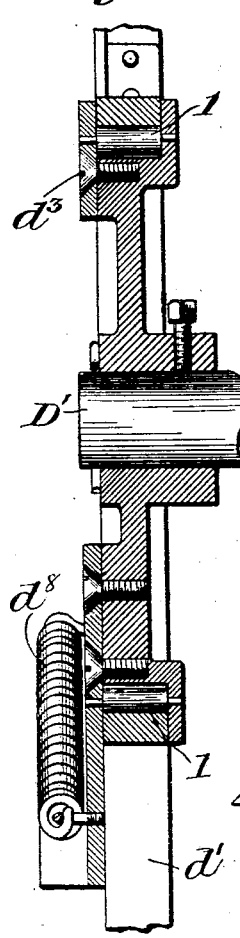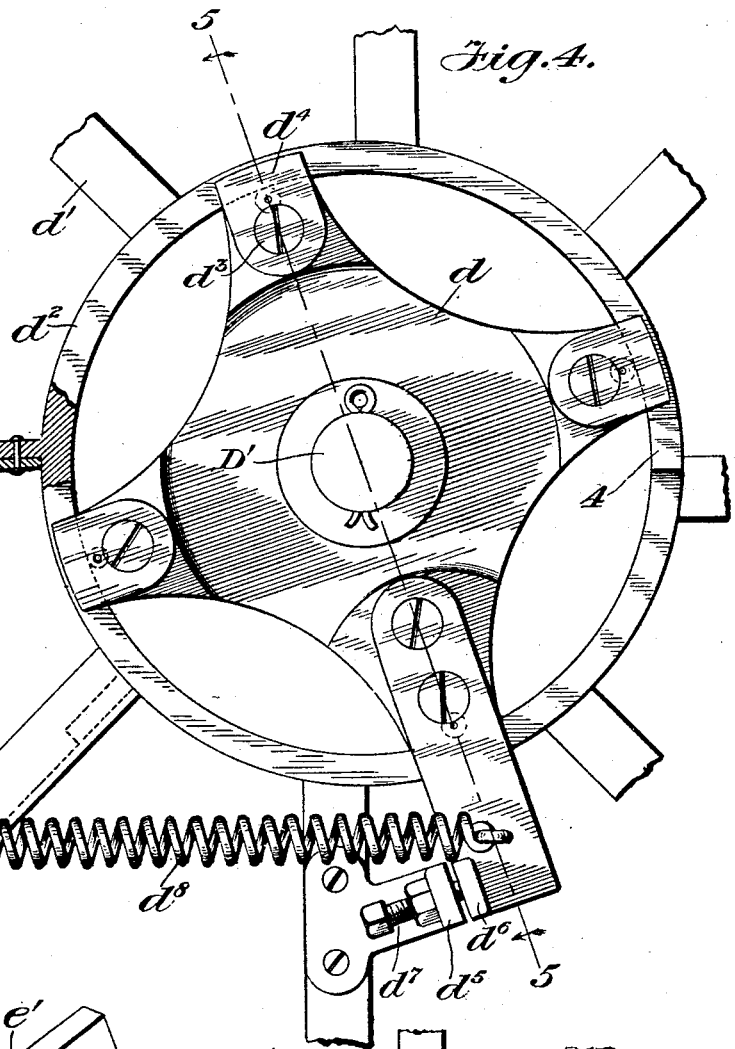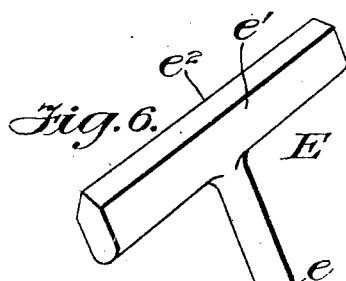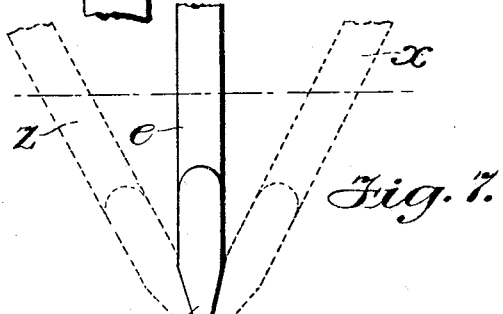

UNITED STATES PATENT OFFICE.

GEORGE W. JARMIN, OF DECATUR, ILLINOIS.

PLANTING-MACHINE.

SPECIFICATION forming part of Letters Patent No. 710,980, dated October 14, 1902.

Application filed April 11, 1902. Serial No. 102,373. (No model.)

*To all whom it may concern:*

Be it known that I, GEORGE W. JARMIN, a citizen of the United States of America, and a resident of Decatur, Macon county, Illinois, have invented a certain new and useful Improvement in Planting-Machines, of which the following is a specification.

My invention relates to planting-machines of that type known as "wireless check-row planters." In corn-planters of this type the mechanism for dropping the corn is operated by a rotary star-wheel, which intermittingly actuates the dropping mechanism, so as to allow the latter to drop or deposit the corn at regular intervals. Ordinarily this star-wheel is mounted upon a rotary shaft provided at each end with ground-wheels adapted to travel upon the ground. These ground-wheels, or "marking-wheels," as they are usually termed, rotate the horizontally-disposed shaft upon which they are mounted, thereby, as stated, causing the star-wheel to intermittingly actuate the mechanism for dropping the corn. In a planting-machine of this type the two marking-wheels are preferably connected with the shaft in such manner as to coöperate or unite in driving the latter, and as the two marking-wheels are arranged one at each side of the machine it will be seen that a momentary deviation from a straight line of travel will tend to cause one wheel to travel faster than the other. For example, while the machine is running straight ahead both wheels are of course traveling at the same rate of speed; but should the machine be turned to the right the left-hand wheel will necessarily tend to rotate faster than the right-hand wheel.

Now one of the principal objects of my invention is to provide an improved arrangement whereby this inclination on the part of one wheel to turn faster than the other will cause no trouble or irregularity in the working of the machine, and to, in fact, provide an improved arrangement whereby either marking-wheel may lag behind the shaft upon which it is mounted, so as to permit of a certain amount of independent rotation on the part of the two wheels. With improved connections and devices for securing this mode of operation it will be seen that neither wheel can cause the other to drag in the ground and that neither wheel can cause the other to turn around in the ground or rotate faster than it should. Consequently with my improved arrangement there will be no liability of the machine being thrown out of check as a result of crooked driving.

A further and special object is to provide an arrangement whereby the marking-wheels are yieldingly held against rotation relatively to the shaft in one direction, but are held positively against relative rotation in the opposite direction.

Another object is to provide a construction and arrangement whereby the hubs of the marking-wheels can be keyed or otherwise secured to the shaft and whereby the spokes and feet of the marking-wheels may be turned relatively to the said hubs.

A further object is to provide an improved construction and arrangement which will permit both the runners and the marking-wheels to be readily lifted or raised from the ground.

In addition to these it is also an object to provide certain details and features of improvement tending to increase the general efficiency and to render a planting-machine of this character more serviceable and reliable.

To the foregoing and other useful ends my invention consists in matters hereinafter set forth and claimed.

In the accompanying drawings, Figure 1 is a side elevation of a wireless check-row corn-planter embodying the principles of my invention. Fig. 2 is a plan of the corn-planting machine shown in Fig. 1. Fig. 3 is a section on line 3 3 in Fig. 2. Fig. 4 is an enlarged side elevation of the hub and adjacent portions of one of the marking-wheels. Fig. 5 is a section on line 5 5 of Fig. 4. Fig. 6 is a perspective of one of the feet or spoke ends with which the marking-wheels are provided. Fig. 7 is a view, more or less diagrammatic in character, illustrating the efficient and advantageous manner in which the said feet or spoke ends of the marking-wheels operate.

It will be understood that the general construction of the corn-planter is unimportant and that the various devices to which my invention does not relate—as, for example, the dropping mechanism, runners, &c.—can be of any suitable known and approved construction. For this reason the said devices have been illustrated only in a general way, and only such parts and devices have been illustrated and shown as are necessary to a full understanding of the nature and operation of the parts or devices to which my invention relates. As thus illustrated, my automatic cornplanter may comprise a suitable front or runner frame A, having the usual runners or furrow-openers $a$. These runners, it will be understood, travel in the ground and make the grooves or channels, in which the corn is dropped at regular intervals. The draft is preferably through the medium of a tongue $a'$, which, it will be seen, can be secured to the runner-frame in any suitable manner. The rear or wheel frame B is preferably pivoted to the front or runner frame at $b$. In this way the wheel-frame, which is provided with the usual vehicle-wheels $b'$, has a jointed or swinging connection with the runner-frame. In addition to this jointed connection the two frames are preferably connected by means of a bellcrank-shaped lever $b^2$, having a pivotal connection at $b^3$ with a rearwardly-extending portion of the runner-frame, which can be the rear end of the tongue or plates secured to the tongue and projecting rearwardly, substantially as illustrated. This lever, which, it will be seen, is preferably in the nature of a hand-lever, can be fulcrumed upon the wheel-frame at $b^4$ and can be provided with a suitable locking bolt or device adapted to engage the rack $b^5$. With this arrangement it will be seen that the driver occupying the seat 1 can grasp the lever $b^2$ and by pulling back on the same can raise the runner-frame, so as to lift the runners from the ground. It will be understood that when raised from the ground the weight of the runner-frame is sustained largely by the neck-yoke carried by the horses at the forward end of the tongue.

The corn or other seed is preferably carried in the usual hoppers or boxes $a^2$, which are mounted upon the runner-frame above the runners. As will be readily understood, the corn is dropped at regular intervals from these boxes or hoppers, and the earth is then pressed over the corn by the wheels $b'$, which follow the runners. As explained, this dropping mechanism can be of any suitable known or approved construction and is preferably operated through the medium of a rod $a^3$, which connects the forwardly-located lever $a^4$ with the rearwardly-located lever $a^5$. As will hereinafter more fully appear, this rod $a^3$ is intermittingly reciprocated for the purpose of operating the dropping mechanism. Any suitable connection can be employed for transmitting the motion of this rod to the dropping mechanism for controlling the escape of the corn from the said boxes or hoppers. The marking-wheel frame C is preferably arranged over the runner and wheel frames of the machine and, as will be observed, at a point between the vehicle-wheels and the seedboxes. Preferably this marking-wheel frame has a swinging connection with the forward portion of the tongue. For example, the said frame can be provided with a forwardly-extending bar $c$, having its forward end adapted to swingingly engage a hook $c'$, secured upon the tongue. With this arrangement it will be seen that the marking-frame which carries the marking-wheels D is capable of a bodily up-and-down movement relatively to the balance of the machine. The said marking-wheels are, it will be observed, preferably arranged to travel or "walk," so to speak, upon the ground at each side of the machine and are mounted upon the transversely and horizontally disposed shaft $D'$, which latter is in turn mounted to rotate in suitable bearings on the marking-wheel frame C. These marking-wheels rotate the said shaft $D'$, so as to cause the star-wheel $D^2$ to intermittingly engage and actuate the lever $c^2$, carried by the marking-wheel frame. This lever $c^2$ is, it will be observed, connected with the previously-described lever $a^4$ by means of the forwardly-extending rod $c^3$. Thus it will be seen that the transmission of power from the rotary star-wheel to the dropping mechanism is first forward to a point adjacent to the pivotal connection between the marking-wheel frame and the tongue and thence back from this point to the said dropping mechanism. As the machine moves forward the marking-wheels, as stated, rotate the shaft $D'$, causing the latter to rotate the star-wheel, and the rotation of the latter intermittingly actuates the dropping mechanism, so as to allow the latter to drop the corn at regular intervals in the grooves or channels being made by the runners. Preferably the said marking-wheel frame is arranged to be raised, so as to lift the marking-wheels from the ground. In this way the said marking-wheels can be raised clear of the ground, so as to permit the machine to be turned around quickly, or as would be desirable in simply driving the machine from one place to another. As a simple and effective arrangement for thus lifting the marking-wheels and marking-wheel frame the latter can be connected by cords or like flexible conductors with a hand-lever 2. This hand-lever is preferably pivoted to an upright portion of the wheel-frame B. The cords or flexible connections can be arranged to travel over sheaves 3, mounted upon the said frame B. With this arrangement the driver or operator can by reaching forward and grasping the lever 2 raise the marking-wheels from the ground.

With the foregoing arrangement and mode of operation it will be seen that a deviation from the line of travel—as, for instance, a slight turn to the right—would tend to rotate the left-hand wheel faster than the right-hand wheel. In other words, crooked driving or turning of the machine to one side or the other will cause one wheel to travel faster than the other. Now with both wheels rigidly secured to the shaft it will be readily seen that more or less trouble would result in such case and that the machine would be liable to get out of check. For example, if the machine is turned to the right with both wheels rigidly secured to the shaft either one of two things must happen. Either the left-hand wheel must cause the right-hand wheel to grind or turn around in the soil, or vice versa. The right-hand wheel must hold the left-hand wheel and cause the latter to slide along on the ground. In either case, however, it will be seen that there is an undesirable torsional strain thrown upon the marking-wheel shaft and that as a result the machine is liable to be thrown out of check. In order to guard against any difficulty of this character, I provide an improved arrangement whereby the shaft may run ahead of either marking-wheel, but whereby neither wheel can run ahead or turn faster than the shaft. Preferably the arrangement is such that the wheels are yieldingly connected for relative rotation in one direction, but positively connected against relative rotation in the other direction.

Any suitable arrangement can be employed for securing this method of operation; but as a simple and effective arrangement the hub $d$ (see Fig. 4) of each marking-wheel is preferably keyed or otherwise rigidly secured to the shaft D'. The spokes $d'$ of each wheel are preferably secured to a ring $d^2$, which latter is mounted to turn upon the hub $d$. Preferably the said ring is held in place upon the hub by means of screws and plates $d^3$ and $d^4$. With this arrangement it will be seen that the spoke portion of each wheel is capable of rotating relatively to the hub portion of each wheel. In other words, the wheels instead of being yieldingly connected directly to the shaft are indirectly connected in this manner by securing the hubs rigidly to the shaft and by then interposing a yielding connection between these hubs and the spokes or outer portions of the wheel. The spoke portion of each wheel is preferably provided with a stop $d^5$, adapted to engage a stop $d^6$, carried by the hub. With this arrangement it will be seen that the spoke portion of each wheel is held positively against relative rotation in one direction, but is capable of more or less relative rotation in the opposite direction. The rotation of the marking-wheel when traveling upon the ground rotates the shaft D' through the medium of the positive engagement of the stop $d^5$ with the stop $d^6$, it being impossible for either wheel to turn faster than the shaft. If desired, the stop $d^5$ can be provided with an adjustable screw $d^7$, adapted to impinge upon the stop $d^6$. In order now to permit the spoke portion of each wheel to have a certain amount of rotation relatively to the shaft—that is to say, in order to allow each marking-wheel to be capable of lagging or turning slower than the shaft—I connect each wheel-hub $d$ with one of the marking-wheel spokes by means of a spring $d^8$. These springs tend normally to hold the two engaging stops of each wheel in engagement, as shown in Fig. 4. It will be seen that should the machine be turned to the right the right-hand wheel, owing to the yielding character of its connection with its hub, will turn slightly relatively to the shaft, or, in other words, will lag behind the shaft to a slight degree. This, it will be seen, prevents any conflict between the two wheels and allows the outside wheel to control the dropping mechanism. The star-wheel shaft is rotated through the medium of a rigid or positive connection with the marking-wheels, but is yieldingly connected with the latter in such manner as to be capable of running ahead or rotating slightly faster than either wheel. Hence, as explained, the machine can be turned to either side, and the wheel on the inside of the turn can run slowly, while the shaft and the wheel on the outside of the turn can turn faster. This, it will be seen, precludes any conflict between the two wheels and at the same time insures at all times a positive rotation of the shaft by one wheel or the other.

Ordinarily the feet of the marking-wheels, which, it will be understood, walk along the surface of the ground, so as to turn the shaft of the star-wheel in the proper manner, are of such character that when inserted in the ground they are liable to slip or "pivot," so to speak, upon a point near the surface of the ground, thereby altering the character of the planting. This is due to the fact that as ordinarily formed each blade is substantially of a uniform width from top to bottom as it goes into the ground. With such formation it will be seen that the course or surface of the soil presents considerable resistance to the forward inclination of a spoke or foot, and that as a consequence the point or bottom of the foot is liable to slip back in order to allow the spoke or blade to pivot about a point near the surface of the ground. In order to insure a better and more perfect working of the marking-wheels, I therefore provide each spoke with a foot E, (see Figs. 6 and 7,) which, it will be understood, comprises a perpendicular reduced upper portion $e$ and a horizontal lower portion $e'$. The said portion $e'$ is preferably provided with an edge or point $e^2$, which, it will be seen, is the first to enter the ground. Suppose the foot thus formed goes into the ground, as shown in dotted lines at X in Fig. 7, the point or edge $e^2$ descends and remains practically stationary at a point indicated by Y. A forward movement of the machine then causes the foot and spoke to move forward—say to the point shown in full lines in Fig. 7. During this movement it will be seen that the greatest resistance offered to the movement of the spoke and foot is at a point considerably below the surface of the ground, and that consequently the perpendicular neck portion $e$ moves forward or cuts easily through the ground, allowing the entire spoke to pivot or practically swing about the point indicated by Y. The spoke and foot may then swing forward to the position shown in dotted lines at Z with the same ease and certainty against back slip, the spaces being at all times regulated and made to correspond to distances between the extreme end portion or edges of the feet. In Fig. 6 it will be readily understood that the perspective shows the foot turned upside down or moved into the position occupied when turned to the top of the wheel.

Thus it will be seen that I provide a simple and efficient construction and employ a method of operation which at all times insures a proper working of the machine. The yielding connections between the hubs and spoke portions of the wheels are strong and simple and of a character to insure against their getting out of order. The springs, it will be observed, involved in these yielding connections do not, so to speak, do any particular work, but merely insure a return of the wheels to their proper or normal positions relatively to the shaft. In other words, the springs involved in my improved yielding connections are merely for the purpose of insuring a return of the wheels and shaft to their normal relations. If desired, antifriction-rolls $l$ can be interposed between the hubs $d$ and the rings $d^2$. In this way the said rings can turn freely relatively to the hubs. Furthermore, it will be seen that the rotation of the spoke structures relatively to the hubs can be limited by stops 4, adapted to engage the projections on the hubs carrying the stops $d^6$. In other words, the hubs and spoke structures are connected to yieldingly rotate relatively in one direction, and, if desired, this relative rotation can be limited by said stops 4.

I claim as my invention—

1. In a planting-machine, the combination of suitable dropping mechanism, a rotary shaft provided with means for intermittingly actuating the dropping mechanism, wheel-hubs secured rigidly to the ends of said shaft, marker-wheel spokes, springs connecting said hubs with said spokes, so as to allow each hub to turn relatively to its allotted spoke structure, and stops carried respectively by the hub and spoke structure and held normally in engagement by said springs.

2. In a planting-machine, the combination of suitable dropping mechanism, a rotary shaft provided with means for intermittingly actuating said dropping mechanism, a wheel-hub rigidly secured to each end of said shaft, a ring mounted upon and capable of rotation relatively to each hub, plates and screws for holding said rings in place, marker-wheel spokes carried by said rings, stops carried by said hubs and engaging stops carried by said spokes, and springs connecting the hubs with the spokes and arranged to hold said stops normally together.

3. In a planting-machine, the combination of a runner-frame carrying seedboxes, a wheel-frame pivotally connected to the runner-frame and carrying vehicle-wheels, a marker-wheel frame arranged over the other said frames at a point practically between the seedboxes and the vehicle-wheels, a tongue rigid with and extending forward from the runner-frame, a bar extending forward from the marker-wheel frame and having a swinging connection with the forward portion of said tongue, a hand-lever, sheaves carried by the said wheel-frame, and flexible connections arranged over said sheaves and connecting said hand-lever with said marker-wheel frame.

4. In a planting-machine, the combination of suitable dropping mechanism, a rotary shaft provided with means for intermittingly actuating said dropping mechanism, wheel-hubs rigidly secured to said shaft, marker-wheel spokes mounted to rotate relatively to said hubs, and antifriction-rolls interposed between the spoke structures and the said hubs.

5. In a corn-planter, a runner-frame, a wheel-frame pivotally connected with the runner-frame, hoppers and dropping mechanism on the runner-frame, a shaft provided with means for actuating said dropping mechanism, marking-wheels having spokes provided at their ends with thin transverse portions, said wheels being loosely mounted on the said shaft, stops normally engaging each other to prevent the wheels from running ahead of said shaft, and springs for permitting the shaft to run ahead of the wheels.

6. In a corn-planter, a runner-frame, a wheel-frame pivotally connected with the runner-frame, a shaft forward of the wheels on the wheel-frame, marking-wheels with T-shaped feet carried by said shaft, stops normally engaging each other to prevent said T-shaped feet from running ahead of said shaft, and springs for permitting said shaft to run ahead of said feet.

7. In a planting-machine, the combination of a runner-frame, a wheel-frame pivotally connected with said runner-frame, suitable seedboxes and dropping mechanism mounted on the runner-frame, a marking-wheel shaft arranged between the seedboxes and vehicle-wheels, marking-wheels loosely mounted upon said shaft, and springs for yieldingly connecting the marking-wheels with said shaft.

8. In a planting-machine, the combination of a suitable runner-frame, a wheel-frame pivotally connected with said runner-frame, suitable seedboxes and dropping mechanism mounted on said runner-frame, a marking-wheel shaft provided with means for intermittingly actuating said feed mechanism, marking-wheels loosely mounted upon said shaft, stops for preventing the wheels from running ahead of said shaft, and springs arranged to yieldingly connect the marking-wheels with said shaft and to permit the latter to turn relatively or run ahead of said wheels.

9. In a planting-machine, the combination of a suitable runner-frame, a wheel-frame arranged in rear of and pivotally connected with the said runner structure, suitable hoppers and dropping mechanism mounted on the runner-frame, a marking-wheel shaft located between the seedboxes and the vehicle-wheels, marking-wheels loosely mounted upon said marking-wheel shaft, stops normally engaging each other to prevent the marking-wheels from running ahead of said shaft, and springs yieldingly connecting the marking-wheels with said shaft and adapted to permit the latter to turn relatively to and run ahead of the said marking-wheels.

10. In a planting-machine, the combination of a suitable runner-frame, a wheel-frame pivotally connected with the runner-frame, suitable seedboxes and dropping mechanism mounted on the runner-frame, a marking-wheel shaft provided with means for intermittingly actuating the dropping mechanism, marking-wheel hubs secured rigidly upon the end portions of said shaft, marking-wheels loosely mounted upon said hubs, stops normally engaging each other to prevent relative rotation between the wheels and hubs in one direction, and springs yieldingly connecting the wheels with their respective hubs and permitting relative rotation between the wheels and shaft in the other direction.

11. In a planting-machine, the combination of a suitable runner-frame, a wheel-frame pivotally connected with said runner-frame, a tongue projecting from the runner-frame, a marking-wheel frame, a draft-rod extending between the marking-wheel frame and the forward portion of the tongue, a marking-wheel shaft mounted upon said marking-wheel frame, hoppers and dropping mechanism on the runner-frame, means on the marking-wheel shaft for intermittingly actuating the dropping mechanism, marking-wheels loosely mounted on said shaft, springs for yieldingly connecting the marking-wheels with said shaft, a hand-lever connected and arranged for raising the runner-frame from the ground, and a second hand-lever connected and arranged for raising the marking-wheel frame and marking-wheels from the ground.

12. In a planting-machine, the combination of a structure having runners and vehicle-wheels, hoppers and dropping mechanism mounted on said frame, a marking-wheel shaft provided with means for intermittingly actuating said dropping mechanism, marking-wheels mounted upon said shaft, connections whereby said shaft and marking-wheels have more or less freedom of movement independently of the balance of the machine, stops normally engaging each other to prevent relative rotation between the shaft and marking-wheels in one direction, springs for permitting relative rotation between the marking-wheels and shaft in the opposite direction, manually-operated means for raising and lowering the runner-frame from the ground, and manually-operated means for raising the marking-wheels from the ground.

13. In a planting-machine, the combination of suitable dropping mechanism, a marking-wheel shaft provided with means for intermittingly actuating said dropping mechanism, marking-wheels loosely mounted upon said shaft, stops normally engaging each other to prevent the wheels from running ahead of said shaft, and springs yieldingly connecting the shaft with said wheels and permitting the shaft to turn relatively and run ahead of said wheels.

14. In a planting-machine, the combination of suitable dropping mechanism, a marking-wheel shaft provided with means for operating said dropping mechanism, marking-wheels loosely mounted upon the shaft, wheel-hubs rigidly secured to the ends of said shaft, marking-wheels loosely mounted upon said hubs, and springs connecting the wheels with their respective hubs and permitting relative rotation between the wheels and said shaft.

15. In a planting-machine, the combination of a runner-frame, a wheel-frame pivotally connected in rear of the runner-frame, a tongue extending forward from said runner-frame, a marker-wheel shaft arranged forward of the wheels of the wheel-frame, a draft-rod connecting said shaft with the forward portion of the tongue, whereby the said shaft swings with the balance of the machine when the line of travel of the machine is altered, marker-wheels loosely mounted on said shaft, stops normally engaging each other to prevent the marker-wheels from running ahead of said shaft, springs arranged to permit the said shaft to run ahead of either of said marker-wheels, when the line of travel of the machine is altered, substantially as described.

16. In a planting-machine, the combination of a runner-frame, a wheel-frame pivotally connected in rear of said runner-frame, hoppers and dropping mechanism on the runner-frame, a marker-wheel shaft arranged between the said hoppers and the wheels on the wheel-frame, a tongue extending forward from said runner-frame, a draft-rod connecting the said shaft with the forward portion of said tongue, marker-wheels mounted on said shaft, springs permitting the said shaft to run ahead of the marker-wheel spokes, stops normally engaging each other to prevent the spokes of the marker-wheels from running ahead of said shaft, and a power-transmitting connection extending forward from the said shaft to the point of connection between said tongue and draft-rod, and extending rearward from this point to the said dropping mechanism.

Signed by me at Decatur, Illinois, this 4th day of April, 1902.

GEORGE W. JARMIN.

Witnesses:
 W. R. CRAMER,
 GUST. F. DUKER.